(12) United States Patent
Mazzocato et al.

(10) Patent No.: US 10,316,279 B2
(45) Date of Patent: Jun. 11, 2019

(54) MULTI-STAGE FILTRATION APPARATUS AND FILTRATION METHOD FOR HETEROGENEOUS FOOD ADMIXTURES

(71) Applicant: VELO ACCIAI S.R.L., San Zenone Degli Ezzelini (TV) (IT)

(72) Inventors: Luigino Mazzocato, Montebulluna (IT); Giovanni Velo, San Zenone Degli Ezzelini (IT)

(73) Assignee: VELO ACCIAI S.R.L., San Zenone Degli Ezzelini (TV) (IT)

(*) Notice: Subject to any disclaimer, the term of this patent is extended or adjusted under 35 U.S.C. 154(b) by 69 days.

(21) Appl. No.: 15/211,711

(22) Filed: Jul. 15, 2016

(65) Prior Publication Data

US 2017/0044473 A1 Feb. 16, 2017

(30) Foreign Application Priority Data

Jul. 15, 2015 (IT) .................. 102015000034714

(51) Int. Cl.
*A23L 2/74* (2006.01)
*C12G 3/08* (2006.01)
(Continued)

(52) U.S. Cl.
CPC .............. *C12H 1/063* (2013.01); *A23L 2/74* (2013.01); *B01D 33/0346* (2013.01);
(Continued)

(58) Field of Classification Search
CPC .. B01D 65/02; B01D 2311/04; B01D 61/145; B01D 61/147; B01D 61/18; C02F 3/1273; C02F 1/444; C02F 11/12; C02F 2103/32
See application file for complete search history.

(56) References Cited

U.S. PATENT DOCUMENTS 4,724,080 A 2/1988 Dau et al.
5,693,229 A * 12/1997 Hartmann ............... A23L 2/087
210/195.2
(Continued)

FOREIGN PATENT DOCUMENTS

EP 0464322 A1 1/1992
FR 2800386 A1 5/2001

OTHER PUBLICATIONS

Machine traslation FR2800386 (A1)—May 4, 2001.*
(Continued)

*Primary Examiner* — Ana M Fortuna
(74) *Attorney, Agent, or Firm* — Kristina Castellano; Castellano PLLC

(57) ABSTRACT

A multi-stage filtration apparatus (100) for heterogeneous food admixtures comprises supply means (I1) for introducing a input heterogeneous admixture (All) being introduced to the multi-stage filtration apparatus (100), a pre-filtration station (M1) which is intended to receive the input heterogeneous admixture (All) being introduced and to separate it into a first admixture portion (Filtr1) and a residual solid admixture portion (Sol1), a filtration station (M2) comprising at least one tangential filter (F1) which is provided to separate from the first admixture portion (Filtr1) a concentrated suspension portion (Concentrata) and a final filtered portion (Finale), at least one supply device (I2) which is provided to circulate the first admixture portion (Filtr1) in the filtration station (M2). The pre-filtration station (M1) comprises at least one vibrating sieve (V1) in order to separate the heterogeneous admixture (All).

3 Claims, 2 Drawing Sheets

(51) Int. Cl.
- *C12H 1/07* (2006.01)
- *B01D 33/03* (2006.01)
- *B01D 61/14* (2006.01)
- *B01D 61/58* (2006.01)
- *B01D 65/02* (2006.01)
- *B01D 71/02* (2006.01)

(52) U.S. Cl.
CPC ........... *B01D 61/142* (2013.01); *B01D 61/58* (2013.01); *B01D 65/02* (2013.01); *B01D 71/022* (2013.01); *C12G 3/085* (2013.01); *A23V 2002/00* (2013.01); *B01D 2311/2649* (2013.01); *B01D 2315/10* (2013.01); *B01D 2315/14* (2013.01); *B01D 2317/02* (2013.01); *B01D 2317/022* (2013.01); *B01D 2317/08* (2013.01); *B01D 2321/16* (2013.01)

(56) References Cited

U.S. PATENT DOCUMENTS

| | | | | |
|---|---|---|---|---|
| 5,800,713 | A * | 9/1998 | Hartmann | A23L 2/74 210/102 |
| 5,958,244 | A * | 9/1999 | Hartmann | B01D 61/025 210/195.2 |
| 6,555,003 | B2 | 4/2003 | Ferro et al. | |
| 7,220,358 | B2 * | 5/2007 | Schacht | B01D 65/00 210/636 |
| 7,419,692 | B1 * | 9/2008 | Kalenian | A23F 5/28 426/433 |
| 8,153,007 | B2 * | 4/2012 | Ikebe | B01D 61/20 210/614 |
| 2003/0205514 | A1 | 11/2003 | Potter et al. | |
| 2012/0034342 | A1 * | 2/2012 | Courbois | C12N 9/2425 426/48 |
| 2015/0093485 | A1 * | 4/2015 | Kornacki | C12H 1/0416 426/442 |
| 2016/0324175 | A1 * | 11/2016 | Dudarev | A23L 27/40 |
| 2016/0366917 | A1 * | 12/2016 | Zandhuis | A23L 2/02 |
| 2017/0044473 | A1 * | 2/2017 | Mazzocato | A23L 2/74 |

OTHER PUBLICATIONS

Derwent abstract—ACC—No. 2016-44117H, Derwent week 201866, Chen J. et al., Jul. 6, 2016.*
Search Report and Written Opinion in related Italian application, dated Mar. 10, 2016.
"Microfiltrazione tangenziale del vino e membrane ceramiche", tecnologiepulite.it, dated Feb. 16, 2015.
Gautier B., "Comparative study between kieselguhr filtration and centrifugation of wines before passing through a tangential filter" (translated), Revue Des Oenologues Et Des Techniques Vitivinicoles Etoenoloques, vol. 65, Jan. 1, 1992, pp. 41-42.

* cited by examiner

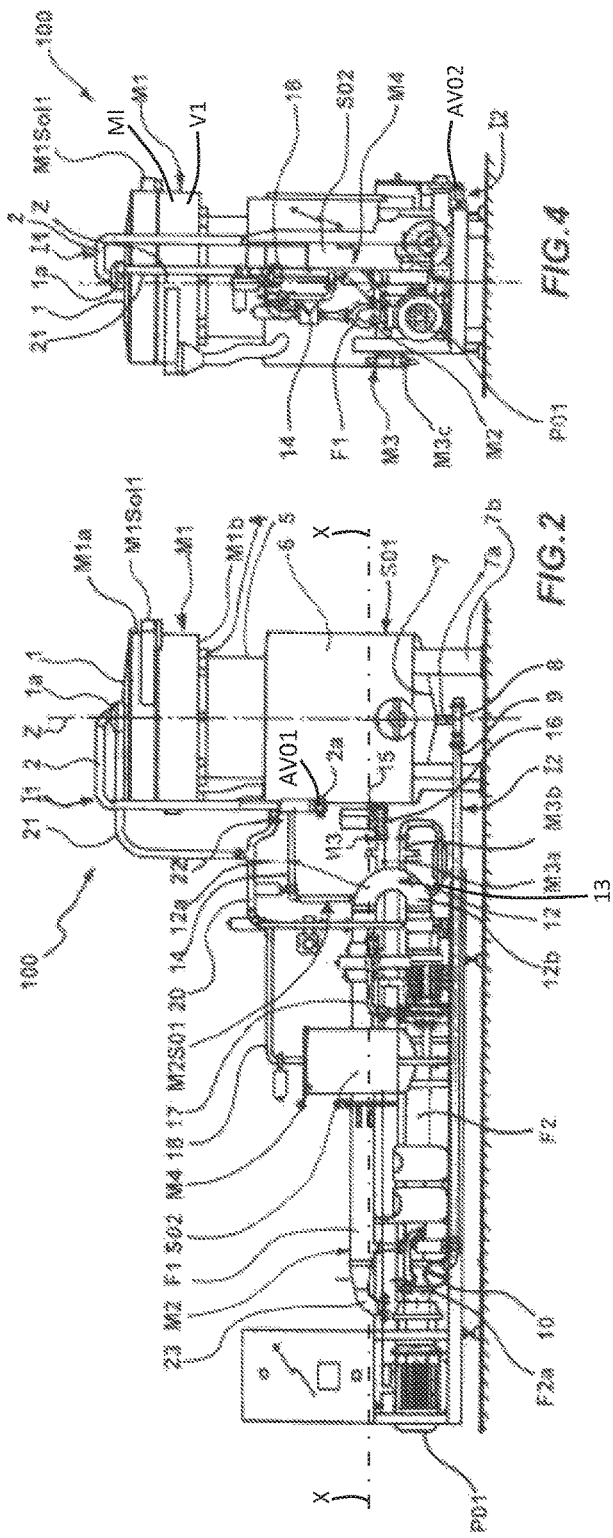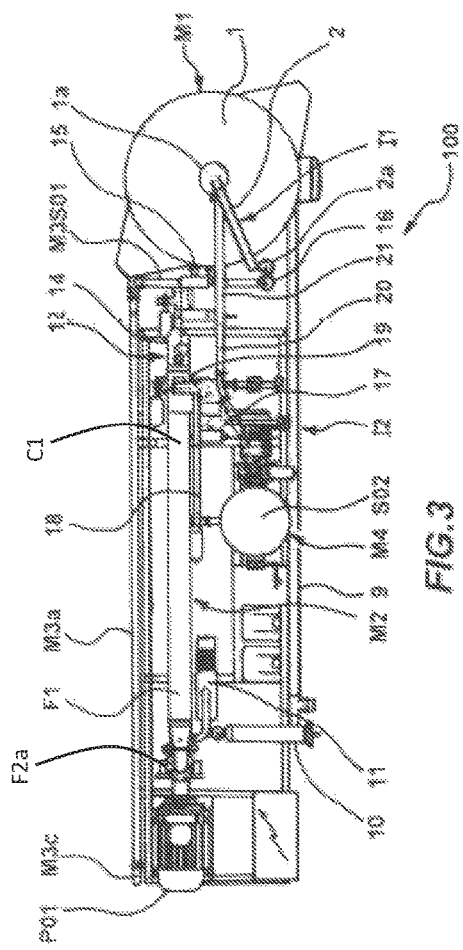

MULTI-STAGE FILTRATION APPARATUS AND FILTRATION METHOD FOR HETEROGENEOUS FOOD ADMIXTURES

TECHNICAL FIELD

The present invention relates to a multi-stage filtration apparatus and a filtration method for filtering heterogeneous food admixtures.

TECHNOLOGICAL BACKGROUND

In the food industry, heterogeneous admixtures are very often processed, that is to say, admixtures containing a plurality of phases which are mixed with each other, the term heterogeneous admixtures in the context of the present description being intended to be understood to refer to liquid or fluid admixtures containing solid particles which have various dimensions and which are dispersed within the liquid phase.

In the sector of filtration of liquids with solid contents which are dispersed therein, and in particular in the oenological sector, it is a fundamental and strategic requirement to be able to filter and purify admixtures and solutions with different corpuscular contents by percentage within short times and obtaining high final purity values.

In that sector, it is known to use tangential filtration separation units.

That technology is particularly versatile for separating the desired dimensions of suspended solid in a selective manner.

In the sector for processing wines, it is necessary to filter and purify a predetermined admixture in respect of undesired particles, solid contaminants and microorganisms, at the same time maintaining the protein and colloid structure in an unchanged state.

It is further fundamental in all the processing processes for oenological suspensions to control and where applicable to reduce the processing temperatures of those admixtures because excessive fluctuations of that parameter could lead to variations and/or adulterations of the organoleptic components contained.

However, that filtration and purification technology has the intrinsic limitation of becoming more effective as the dimensions of the corpuscular components become increasingly similar to the ideal dimensions for the interaction with the holes of the membrane contained in the system for tangential filtration, and the quantities of solid material in suspension do not exceed predetermined values.

As a result, among the most significant critical states correlated with the industrial use of that technology, there are frequent blockages of the filters which involve a decrease in the performance of the tangential filters and a resultant increase in the general process times as a result of the large number of suspensions of the filtration processes which are dedicated to the cleaning and restoration steps of the filters.

That disadvantage is particularly evident in the oenological industry in which the heterogeneous admixtures to be processed comprise significant quantities of solid portions, such as grapes and sediments, which have dimensions which may also be quite different from each other and which are very variable, and with rheologically different behaviours.

Those admixtures cause frequent, problematic blockages of the sieve-like filters which are normally used in those technological contexts.

Therefore, it is often necessary to stop the processing process in order to clean the filters in respect of the solid portions.

Furthermore, tangential filters are not suitable for processing heterogeneous admixtures having solid particles with great dimensions because they could permanently damage the membranes of the tangential filters.

Tangential filters are not suitable for processing admixtures having high percentage rates of solid portions therein.

Another disadvantage of filtration with tangential filters is the undesirable increase of the temperature of the heterogeneous admixture being processed during the filtration which involves the risk of varying the organoleptic properties and characteristics of the admixture.

Therefore, it can readily be seen that, for the above-mentioned reasons, processing admixtures having a high content of solid components in plants having technologies which use tangential filters is definitely not recommended.

OBJECT OF THE INVENTION

An object of the invention is therefore to provide a multi-stage filtration apparatus and a filtration method for heterogeneous food admixtures which overcome the disadvantages set out above with reference to the cited prior art.

A particular object of the invention is to provide a filtration apparatus which allows effective processing of large quantities of heterogeneous admixtures which also have significant percentage rates of solid suspensions.

Another object is to provide a filtration apparatus for heterogeneous admixtures which allows the benefit of the high selectivity which can be obtained with the tangential filter systems to be maintained and, at the same time, allows a reduction in the stoppages provided for the maintenance and the restoration of the above-mentioned types of filters.

According to a first aspect of the invention, there is provision for a multi-stage filtration apparatus for heterogeneous food admixtures comprising a pre-filtration station which is positioned upstream of a filtration station which operates by means of tangential filters, wherein the pre-filtration station comprises a filter for separation by means of vibrations, that is to say, a vibrating sieve.

The provision of the vibration type separation filter allows rapid and efficient filtering of solid components including those of coarse and varied dimensions which are contained in the heterogeneous admixture to be processed (grapes, sediments, etc.).

In this context, the term "heterogeneous admixture" is used to identify an admixture comprising at least one solid phase and at least one liquid phase therein.

The provision of the filtration phase with a vibrating sieve upstream of the filtration phase with tangential filters allows a reduction in blockages of the tangential filters and, therefore, an increase in the operating times between two successive stoppages for cleaning the filters.

As a result of these features, the Applicant has found that it is possible to use input heterogeneous admixtures being introduced into the filtration apparatus of the invention having solid contents in suspension of up to 40% of the ratio between the volumes of solid to the total volume of the admixture.

Therefore, that advantage involves a greater versatility of the multi-stage apparatus in the filtration process and a reduction in the process times as a result of the less frequent maintenance operations necessary for cleaning and restoring the tangential filters.

Preferably, the pre-filtration station comprising the vibrating sieve has a generally cylindrical structure which extends about a longitudinal centre axis Z. That longitudinal centre axis Z defines an almost vertical orientation of the structure of the pre-filtration station, which is substantially perpendicular to the horizontal spatial extent X of the filtration station comprising the tangential filters.

In a preferred version, the concentrated solution being discharged from the filtration station with tangential filters is supplied to the pre-filtration unit in order to be filtered again. In a preferred version, there is provided a cooling station which is received between the filtration station with tangential filters and the pre-filtration station in order to cool a concentrated suspension portion being discharged from the filtration station with tangential filters. There is thereby obtained the additional advantage of being able to select and optimize the temperature and the viscosity of the portion of admixture being discharged from the filtration station with tangential filters.

In the context of the present description, the term suspension is intended to be understood to be an admixture comprising at least two phases, of which one is a minority micrometric solid with respect to another majority liquid phase.

A cold concentrated suspension portion is transferred to a tank of the pre-filtration station.

The filtration process by means of tangential filters tends to increase the quantity of solid material in the circulating suspension, generally producing a possible increase of the total temperature of the admixture. Therefore, it is advantageous to be able to selectively decide how much and what portion of the circulating liquid to cool in order to maintain the optimum conditions of temperature and viscosity of the admixture preserving advantageous characteristics of the suspension, such as, for example, the organoleptic properties thereof.

The circulation of the concentrated suspension portion through the tangential filters involves an increase of the solid contents which are dispersed therein and a consequent increase of the temperature of the admixture. In order to prevent the suspension from reaching undesirable temperature values, the concentrated suspension may selectively be conveyed to the above-mentioned cooling station in order to reduce the temperature thereof.

In particular, the cooling station comprises two tubular extensions which are placed at different levels and in accordance with a horizontal orientation and which are intended for the heat exchange with cooling materials which are advantageously provided. In particular, the cooling station comprises a tube-in-tube type heat exchange apparatus by means of glycol circulation, but for a person skilled in the art it will be commonplace to use other types of technical solutions which are capable of fulfilling the same function.

At the discharge of the cooling station there is connected a first connection pipe which allows a transfer of the cold concentrated suspension portion which is obtained at the end of the cooling process, again in a first tank. In another embodiment, the cold concentrated suspension portion is conveyed to a discharge of the filtration apparatus and discharged and is no longer processed in the multi-stage filtration apparatus of the invention.

If the user desires not to cool the concentrated suspension being discharged at the tangential filters, it is possible to convey the concentrated suspension directly into the first tank by means of a second connection pipe which is advantageously provided.

The first tank also carries out the function of collection chamber which advantageously contains both hot and cold concentrated suspension portions, in addition to any portions of the first admixture portion which are filtered only through the pre-filtration station, so as to be able to further control the temperatures, the viscosity, the flows and other functional characteristics of the filtered admixtures.

In another preferred embodiment, the filtration station comprises two tangential filters which are arranged at different levels in accordance with a substantially horizontal orientation which is perpendicular to the longitudinal centre axis Z.

Other advantageous aspects of the invention are described in the preferred embodiments to which the dependent claims relate.

BRIEF DESCRIPTION OF THE DRAWINGS

FIG. 2 is a side view of the multi-stage filtration apparatus of the invention;

FIG. 3 is a top view of the multi-stage filtration apparatus of the invention;

FIG. 4 is a front view of the multi-stage filtration apparatus of the invention.

PREFERRED EMBODIMENT OF THE INVENTION

Figure 1:
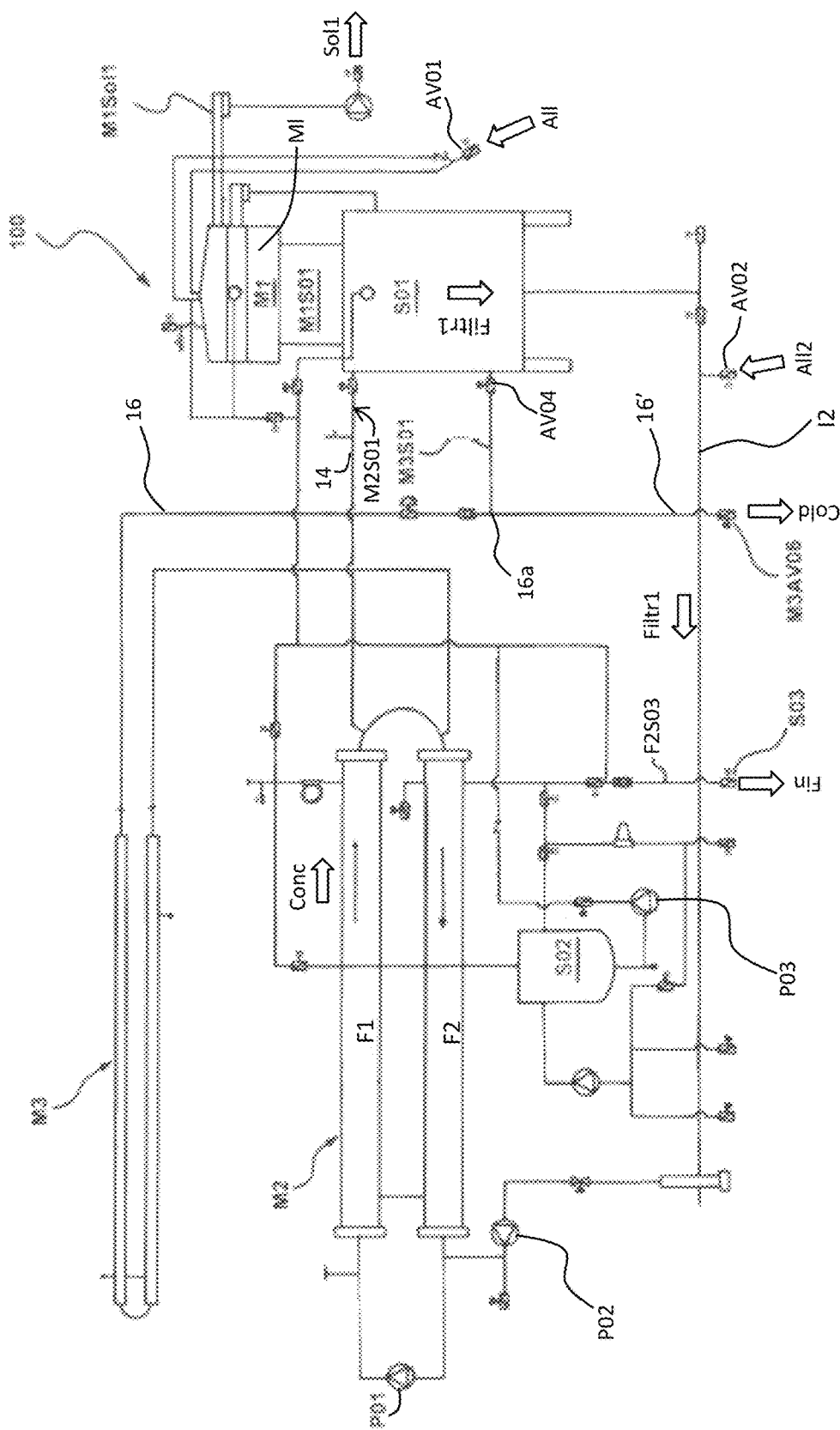
FIG. 1 is a simplified diagram of the connections of the multi-stage filtration and purification apparatus of the invention.

In the Figures, there is generally designated 100 a multi-stage filtration apparatus for heterogeneous food admixtures constructed according to the present invention.

The apparatus 100 is in particular provided to carry out a multi-stage filtration process for heterogeneous admixtures concerning the oenological production system but it could readily be used or readily adapted by a person skilled in the art for/to a process for processing different types of heterogeneous food admixtures (for example, fruit juices, etc.).

The apparatus 100 is particularly suitable for processing heterogeneous admixtures which contain wine sediment or must sediment.

In this context, the term "heterogeneous admixture" is used to identify an admixture comprising at least one solid phase and at least one liquid phase therein.

The apparatus 100 comprises at least one supply device "I1" in order to supply by means of a first inlet "AV01" a input heterogeneous admixture "All" being introduced in the filtration apparatus 100 and a pre-filtration station M1 which is intended to receive the input heterogeneous admixture "All" being introduced and to separate it into a first admixture portion "Filtr1" and a residual solid admixture portion "Sol1".

The first admixture portion "Filtr1" corresponds to the heterogeneous admixture portion "All" which is filtered and passed through the pre-filtration station M1 while the residual solid admixture portion "Sol1" corresponds to the input heterogeneous admixture portion "All" which is blocked by the pre-filtration station M1.

The pre-filtration station M1 has a generally cylindrical form which extends about a longitudinal centre axis Z and which is delimited by a lateral surface "Ml" and by opposite bases which are substantially planar and which are axially opposed with respect to Z, by an upper portion "M1a" and a lower portion "M1b". The upper portion "M1a" is connected to a cover 1 which comprises an upper connection 1a, on which there is provision for the insertion of the supply device "I1".

Externally, the pre-filtration station M1 has a first connection M1Sol1 which extends out of the generally cylindrical structure in a direction which is tangential to the cylindrical surface MI of the pre-filtration station M1.

The pre-filtration station M1 comprises at least one vibrating sieve "V1".

In a preferred version, the vibrating sieve V1 is of the type with a superficial sieve mesh of the product between 1.2 and 1 m$^3$, preferably of approximately 1.13 m$^3$.

The size of the holes of the vibrating sieve V1 is selected on the basis of the characteristics of the heterogeneous admixture involved.

In particular, the vibrating sieve V1 may have holes of 250 mc if the heterogeneous admixture is wine sediment and approximately 500 mc if the heterogeneous admixture to be processed is must sediment.

The vibrating sieve V1 is supplied by a motor having a power of 1.1 kW.

The pre-filtration station M1 comprises at least one filter for separation by means of vibrations, a filtering sieve.

The lower portion M1b is connected by means of a first connection element 4 to a cylindrical duct 5 which is capable of transferring the individual content to a first tank S01 which is connected and therebelow and which is generally composed of a cylindrical member 6.

In particular, there is caused to pass through the cylindrical duct 5 the first admixture portion Filtr1 which is filtered through the pre-filtration station M1 by the vibrating sieve V1, the remaining residual portion of solid admixture Sol1, which is blocked by the vibrating sieve V1, is transferred instead by means of the first connection M1Sol1 to a storage container which is not shown in the Figures.

The filtration apparatus 100 further comprises a filtration station M2 which is provided for filtering the first admixture portion Filtr1 and a supply device "I2" which is provided to supply the first admixture portion Filtr1 to the filtration station M2. The supply device "I2" is operatively connected to a lower portion of the first tank SO1, that is to say, in the tank portion opposite the cylindrical duct 5 with respect to the axis Z.

In a preferred form, the supply device I2 comprises connection elements for operatively connecting the tank SO1 and the filtration station M2. The supply device I2 comprises a second lower connection 7 which is secured in an upper portion thereof (with respect to the axis Z) to the first tank SO1 and which terminates in a connection 7a. The connection 7a is in turn connected by means of a first connection path to a three-way connection element 8 which communicates by means of one of the other two paths with a transfer pipe 9. The transfer pipe 9 is connected in the region of the opposite ends thereof to the three-way element 8 and the filtration station M2, respectively.

The first tank SO1 is supported in a stable position by a plurality of legs 7b.

In a preferred embodiment, the supply device I1 comprises a connection tube 2 which is connected at one end to the upper connection 1a and at the other end to the first inlet AV01.

The connection tube 2 has a flow connection and control element 2a which is received at the free end thereof.

The supply device I2 further comprises a second pump P02 which is inserted between the filtration station M2 and the pre-filtration station M1 and which is provided to circulate of the first admixture portion Filtr1. The second pump P02 is configured to optimize the transfer of the solution from the first tank SO1 to the filtration station M2.

In another embodiment, the supply device I2 provides for a second inlet AV02 which is positioned downstream of the first tank S01 which allows direct insertion upstream of the filtration station M2 of another heterogeneous admixture AII2 to be processed which is mixed with the first admixture portion Filtr1 before the introduction into the filtration station M2.

The filtration station M2 comprises at least a first tangential filter F1 for filtering the first admixture portion Filtr1 so as to separate from the first admixture portion Filtr1 a concentrated suspension portion "Conc" and a final filtered portion "Fin".

The filtration station M2 further comprises a first pump P01, or the like, which is provided to circulate the admixture to be filtered through the various elements which are cooperating in a fluid-dynamic manner.

In a preferred embodiment, the filtration station M2 comprises two tangential filters F1 and F2 which are connected to each other in series.

Advantageously, the first filter F1 and the second filter F2 have a mutually similar structure.

The first and the second tangential filters F1 and F2 are of the same type as the tangential filters which are arranged to process in succession the first admixture portion Filtr1 in order to separate therefrom a concentrated suspension portion "Conc" and a final filtered portion "Fin".

In a preferred embodiment, the final filtered portion "Fin". is collected by means of a connection F2S03 which is connected at an end thereof to the tangential filter F1 or to one of the above-mentioned tangential filters F1 or F2 and, at the other end, to a final valve connection S03. That connection is in turn connected to a collection tank (not shown in the Figures) in which the final filtered portion "Fin" is collected.

The tangential filter F1 is a membrane type filter of stainless steel or ceramic materials or polymer materials. The membrane type is selected on the basis of the admixture to be processed and the percentage of the solids present therein. In a preferred form, they are of stainless steel.

The tangential filters are arranged so as to be substantially perpendicular to the longitudinal centre axis Z.

In particular, the first pump P01 has a power of 15 kW so as to supply the tangential filter F1 at a flow rate of the first admixture portion Filtr1 between 3 and 12 ht/h. In that manner, there is produced a pressure inside the tangential filter(s) between 7 and 10 bar.

In an embodiment, the first and second filters F1, F2 are connected in the manner of a ring so that the admixture can be selectively recirculated continuously between the first tangential filter F1 and the second tangential filter F2.

In a preferred embodiment, a transfer pipe is operatively connected in the region of a terminal zone of the second tangential filter F2 by means of a second three-way connection element F2a. The connection element F2a is connected at the opposite end to the end connected to the second tangential filter F2 to the first pump P01 which is inserted in line with respect to the circuit of the filtration station M2. By means of the third path of the second connection element F2a, there is connected a first curved pipe 23 which is capable of transferring the circulating liquid into the tangential filter F1 which is connected downstream of the first curved pipe 23.

The other end of the first tangential filter F1 is connected to a second curved pipe 12 which is provided to transfer the circulating liquid again into the second tangential filter F2:

by means of those elements, there is produced a first circulation C1 of the circulating liquid to be filtered.

The temperature of the circulating admixture in the first circulation C1 is monitored by means of a thermal probe. In a preferred form, the thermal probe is a PT100 having a range of use between −50° C. and +800° C.

In particular, the second curved pipe 12 has a first and a second annular connection portion 12a and 12b. In a preferred embodiment, the first annular connection portion 12a is connected to a second connection pipe M2S01, comprising a third connection 14, which is inserted in an upper lateral section of the first tank S01, which is provided for transferring therein a predetermined quantity of a concentrated suspension portion "Conc" which is obtained at the discharge from the filtration station M2e circulating in the first circulation C1.

The apparatus 100 further comprises a cooling station M3 for cooling the concentrated suspension portion "Conc".

Advantageously, furthermore, the second curved pipe 12 has in the lower portion the second annular connection portion 12b which is arranged at the opposite side in accordance with the axis Z with respect to the first annular connection portion 12a. The second annular connection portion 12b radially receives on the curvilinear development axis thereof a fourth connection 13 which is also tubular in form. That fourth connection 13 is connected at the opposite end with respect to the second annular connection portion 12b to a second cooling element M3b in the cooling station M3. The cooling station M3 is intended to lower the temperature of the circulating concentrated suspension portion "Conc". At the inlet to the cooling station M3, it is possible to control the quantity of the concentrated suspension portion "Conc" to be cooled.

That reduction function of the temperature brings about a significant technical advantage allowing fine control of the temperature of the admixture processed and also the viscosity thereof.

This allows optimization of the organoleptic properties of the admixture which is obtained as well as optimization of the general multi-stage filtration process of the present invention.

Furthermore, as a result of the structural and functional features of the present invention, it is possible to selectively decide how much and what portion of the circulating liquid to introduce into the above-mentioned cooling station M3 in order to modify or maintain the desired temperature and viscosity conditions of the admixture, thereby preserving advantageous characteristics, such as, for example, the organoleptic properties thereof.

That cooling station M3 further comprises a first cooling element M3a which is connected by means of a fifth connection 16, a three-way connection 16a, a tubular connection 16' and a valve connection M3AV06, which are connected to each other in series in this order, to a tank (not shown in the Figures) which is provided for collecting a cold concentrated suspension portion "Cold".

Preferably, a tubular extension M3S01 is connected at one end thereof to the three-way connection 16a and at the other end to a lower inlet of the first tank S01 by means of a tubular connection 15 and a valve AV04 which are connected in series, the valve AV04 being received in the region of the first tank S01.

The cold concentrated suspension portion "Cold" may selectively be introduced into the first tank S01 or into a tank (not shown in the Figures) at the discharge from the multi-stage filtration apparatus 100.

Furthermore, the multi-stage filtration apparatus 100 comprises at least one control device AV04 which is capable of controlling a discharge flow of the concentrated suspension portion "Conc" from the three-way connection 16a towards the first tank S01.

The cooling station M3 is preferably operative at temperature ranges between 7 and 12° C. and comprises a heat exchange surface-area of 1.2 m$^3$.

The filtration apparatus 100 further comprises a washing station M4 which is capable of cleaning the filters and other components contained in the stations provided for filtration.

Advantageously, the washing station M4 is provided parallel with the pre-filtration station M1 and the filtration station M2.

The washing station M4 comprises a third pump P03 or the like, which is capable of circulating cleaning liquids in the at least one tangential filter F.

The third pump P03 is connected in line to a second tank S02 and to a sixth tubular connection 17, which is operatively connected at the other end to an eighth connection 19 which terminates in a portion of the first tangential filter F1.

In another embodiment, the washing station M4 is provided with pipelines so as to allow the circulation of the cleaning liquids through all the operatively connected ducts of the filtration station M2.

For the person skilled in the art, it is commonplace to select the type of cleaning liquids which is most suitable (acids, bases, polar, apolar, alcohols, etc.) in order to carry out an efficient removal of the contaminants present.

In another preferred embodiment, the washing station M4 is further provided with additional pipelines which are capable of circulating the cleaning liquid in the pre-filtration station M1 and/or in the first tank S01.

The second tank S02 is in the upper portion connected to a seventh connection 18, which is operatively connected to a ninth connection 20 which transports the cleaning liquids in the upper connection 1a by means of a tenth connection 21 and the cylindrical member 6 of the first tank S01.

Preferably, the filtration apparatus 100 of the invention comprises mainly four functional stations, of which two are intended for the filtration and purification process, one for the pre-filtration process and one for a washing station.

The operating methods of the multi-stage filtration apparatus 100 which define the method of the present invention comprise the steps described below.

The input heterogeneous admixture All to be processed is introduced into the processing circuit via supply means I1 and from there it is transferred to the pre-filtration station M1. In that station there is provided a vibrating sieve V1 which separates from the input heterogeneous admixture "All" being introduced a residual solid admixture portion Sol1 and a first filtered admixture portion Filtr1. That residual solid admixture portion Sol1 is collected by means of a dedicated circuit and is controlled by way of storage means according to the preferences of the user in accordance with the teaching set out in the prior art.

The first filtered admixture portion Filtr1 which is obtained by filtration of the input heterogeneous admixture All is collected in a first tank S01 and is subsequently transferred to and advantageously circulated in the filtration station M2 with tangential filters. The movement of the first filtered admixture portion Filtr1 in the filtration station M2 is brought about by means of the supply device I2 which is advantageously provided.

Once the filtration station M2 has been reached, the first filtered admixture portion Filtr1 is further processed by means of the at least one tangential filter F1 which is received therein, being separated into a concentrated suspension portion "Conc" which contains a greater percentage of solid suspensions with respect to the first filtered admixture portion Filtr1 being introduced into the tangential filter F1 and a final filtered portion "Fin", having the desired purity characteristics. The final filtered portion "Fin" will in fact have no suspensions and will be sterilized in respect of organisms such as yeasts and bacteria.

In a preferred embodiment, the final filtered portion "Fin" is collected in a suitable collection tank and is not subjected to other filtration steps.

In a variant of the above-mentioned method, there may be provided a second tangential filter F2 which is arranged downstream of the first tangential filter F1 and which is provided in order to further filter the concentrated suspension portion "Conc" in order to further improve the properties of the.

In another version of the method, there may be provision for cooling the concentrated suspension portion "Conc" being discharged from the first tangential filter F1 before supplying it to the second tangential filter F2.

In another preferred embodiment, the above-mentioned method comprises the step of introducing into the pre-filtration station M1 the input heterogeneous admixture All, including at least one solid phase and at least one liquid phase, having a quantity of solid material which is expressed as a volume of solid material divided by the total volume of the heterogeneous food admixture between 0% and 40%.

Naturally, in the above-described invention a person skilled in the art would be able to provide additional modifications and variants for the purpose of satisfying specific and contingent application requirements, which variants and modifications are in any case included in the scope of protection as defined by the appended claims.

The invention claimed is:

1. A method for filtering heterogeneous food admixtures, including at least one solid phase and at least one liquid phase therein, comprising the steps of:
supplying an input heterogeous food admixture to a pre-filtration station, pre-filtering the heterogeneous admixture in the pre-filtration station to obtain a first filtered admixture portion and a residual solid admixture portion, and collecting the first filtered admixture portion in a tank,
supplying a filtration station comprising at least one tangential filter with the first admixture portion;
producing a concentrate portion and a final filtered portion in the at least one tangential filter,
directing the concentrate to a cooling step for cooling the concentrate suspension portion, and
recirculating the cooled concentrate suspension portion to the tank having the first filtered admixture portion;
wherein the pre-filtering step comprises separating the input heterogeneous admixture by means of at least one vibrating sieve witch is contained in the pre-filtration station and,
wherein the input heterogeneous food admixture having a quantity of solid material expressed as a volume of solid material divided by the total volume of the heterogeneous food admixture of 1% to 40%.

2. The method for filtering heterogeneous food admixtures according to claim 1, comprising a washing step which is capable of cleaning the components of the pre-filtration station and/or the filtration station.

3. The method for filtering heterogenous food admixtures of claim 1, wherein the range of quantity of solid material divided by the total volume of the heterogeneous food admixture is between 27% and 40%.

* * * * *